United States Patent
Dumais

(10) Patent No.: US 10,359,569 B2
(45) Date of Patent: Jul. 23, 2019

(54) OPTICAL WAVEGUIDE TERMINATION HAVING A DOPED, LIGHT-ABSORBING SLAB

(71) Applicant: Huawei Technologies Co., Ltd., Shenzhen (CN)

(72) Inventor: Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/149,457

(22) Filed: May 9, 2016

(65) Prior Publication Data

US 2017/0322377 A1    Nov. 9, 2017

(51) Int. Cl.
| | |
|---|---|
| G02B 6/10 | (2006.01) |
| G02B 6/24 | (2006.01) |
| G02B 6/122 | (2006.01) |
| G02B 6/125 | (2006.01) |
| G02B 6/136 | (2006.01) |
| G02B 6/12 | (2006.01) |

(52) U.S. Cl.
CPC ............ *G02B 6/243* (2013.01); *G02B 6/122* (2013.01); *G02B 6/125* (2013.01); *G02B 6/1228* (2013.01); *G02B 6/136* (2013.01); *G02B 2006/12097* (2013.01)

(58) Field of Classification Search
CPC ...... G02B 6/243; G02B 6/1228; G02B 6/125; G02B 6/136; G02B 2006/12097; G02B 2006/12126
USPC .......................................... 385/129–132, 139
See application file for complete search history.

(56) References Cited

U.S. PATENT DOCUMENTS

| | | | | |
|---|---|---|---|---|
| 4,372,641 | A | 2/1983 | Johnson et al. | |
| 5,933,562 | A * | 8/1999 | Dutting | G02B 6/1228 385/129 |
| 6,181,722 | B1 * | 1/2001 | Dutting | B82Y 20/00 372/45.01 |
| 7,113,676 | B2 * | 9/2006 | Piede | G02B 6/1228 385/31 |
| 7,539,373 | B1 * | 5/2009 | Logvin | G02B 6/12004 385/28 |
| 7,776,236 | B2 * | 8/2010 | Shih | G02B 6/1221 264/1.24 |
| 7,796,656 | B2 * | 9/2010 | Watson | H01S 5/12 372/102 |
| 8,031,991 | B2 * | 10/2011 | Webster | G02B 6/1228 385/28 |

(Continued)

FOREIGN PATENT DOCUMENTS

WO    WO03050580    6/2003

OTHER PUBLICATIONS

Vilson R. Almeida et al., "Nano-taper for Compact Mode Conversion," Optics Letters, vol. 28, No. 15, pp. 1302-1304, 2003.

(Continued)

*Primary Examiner* — Thomas A Hollweg
*Assistant Examiner* — Hung Q Lam

(57) ABSTRACT

An optical waveguide termination includes a light-receiving inlet for receiving light to be terminated, a rib waveguide extending from the inlet, a doped, light-absorbing slab supporting the rib waveguide for absorbing light from the rib waveguide, and a tip at an end of the rib waveguide. The optical waveguide termination exhibits low back-reflection.

7 Claims, 9 Drawing Sheets

(56) References Cited

U.S. PATENT DOCUMENTS

| | | | | |
|---|---|---|---|---|
| 8,649,641 B2* | 2/2014 | Wesstrom | G02B 6/12019 | 385/14 |
| 8,649,645 B2* | 2/2014 | Pitwon | G02B 6/1221 | 385/122 |
| 9,158,057 B2* | 10/2015 | Alphonse | G02B 6/0073 | |
| 9,195,001 B2* | 11/2015 | Hatori | G02B 6/1228 | |
| 9,274,280 B2* | 3/2016 | Ushida | G02B 6/12 | |
| 9,465,163 B2* | 10/2016 | Kumar | G02B 6/122 | |
| 2004/0061122 A1* | 4/2004 | Alphonse | H01L 33/0045 | 257/94 |
| 2005/0018988 A1* | 1/2005 | Shih | G02B 6/1221 | 385/129 |
| 2005/0053346 A1* | 3/2005 | Deng | G02B 6/12 | 385/129 |
| 2005/0123232 A1* | 6/2005 | Piede | G02B 6/1228 | 385/14 |
| 2006/0285797 A1* | 12/2006 | Little | G02B 6/1228 | 385/43 |
| 2009/0136173 A1* | 5/2009 | Logvin | G02B 6/12004 | 385/14 |
| 2011/0064355 A1 | 3/2011 | Soma et al. | | |
| 2012/0057817 A1* | 3/2012 | Wesstrom | G02B 6/12019 | 385/24 |
| 2012/0224813 A1* | 9/2012 | Chen | G02B 6/1228 | 385/43 |
| 2012/0230635 A1* | 9/2012 | Yoshida | G02B 6/125 | 385/43 |
| 2012/0263410 A1* | 10/2012 | Feng | G02B 6/43 | 385/14 |
| 2013/0039619 A1 | 2/2013 | Laughlin | | |
| 2013/0308333 A1* | 11/2013 | Alphonse | G02B 6/0073 | 362/555 |
| 2014/0105544 A1* | 4/2014 | Ushida | G02B 6/12 | 385/77 |
| 2014/0185979 A1 | 7/2014 | Evans et al. | | |
| 2014/0332918 A1* | 11/2014 | Li | H01L 31/02327 | 257/432 |
| 2015/0212271 A1 | 7/2015 | Chen | | |
| 2015/0253472 A1 | 9/2015 | Kumar et al. | | |
| 2016/0077282 A1* | 3/2016 | Lipson | G02B 6/4291 | 385/30 |
| 2016/0327741 A1* | 11/2016 | Wu | H04B 10/2581 | |

OTHER PUBLICATIONS

International Search Report for corresponding International Application No. PCT/CN2017/079754 dated Jun. 28, 2017.

* cited by examiner

OPTICAL WAVEGUIDE TERMINATION HAVING A DOPED, LIGHT-ABSORBING SLAB

TECHNICAL FIELD

The present disclosure relates generally to optical waveguides and, more particularly, to optical waveguide terminations.

BACKGROUND

Silicon photonic circuits complexity, density, and number of elements are growing as photonics gradually enters telecommunications products. Some large switch matrixes may have several hundred components in a single circuit. In several common switch architectures, some optical waveguides must be terminated. The termination of optical waveguides may also be required for other types of optical circuits and components such as those integrated into photonic platforms.

Imperfect termination causes back-reflections which are known to introduce noise in the optical signals propagating in the optical circuit or component. In a large component the individual noise contributions from these back-reflections can interact coherently to create unpredictable and significant impairments.

Accordingly, an improved technique for terminating waveguides is highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present specification discloses an optical waveguide termination for use primarily in silicon photonic integrated circuits. The optical waveguide termination includes a doped, light-absorbing slab to absorb light.

One inventive aspect of the disclosure is an optical waveguide termination that includes a light-receiving inlet for receiving light to be terminated, a rib waveguide extending from the inlet, a doped, light-absorbing slab supporting the rib waveguide for absorbing light from the rib waveguide, and a tip at an end of the rib waveguide.

In some implementations, the rib waveguide is also doped. In some implementations, the rib waveguide comprises a curved waveguide section, a semicircular waveguide section or a spiral-shaped waveguide section. The rib waveguide has in some instances a waveguide width that continuously decreases from the inlet to the tip. The light-receiving inlet may include an input ridge waveguide connected by a first transition to a down-tapered waveguide section which is connected by a second transition to the rib waveguide. The first transition may be a diverging taper and the second transition may be a converging taper. In some instances, the rib waveguide is narrower than the input ridge waveguide.

In some implementations, the rib waveguide and doped, light-absorbing slab are formed by partially etching a silicon layer.

In some implementations, the doped, light-absorbing slab comprises an angled back facet.

In some implementations, the tip is tapered.

In some implementations, the doped, light-absorbing slab comprises a dopant gradient.

In some implementations, the doped, light-absorbing slab is shaped and angled to internally reflect light to thereby function as a resonating absorber.

Another inventive aspect of the disclosure is a photonic platform including a substrate, a buried oxide layer on the substrate, an optical circuit formed in an active silicon layer and an optical waveguide termination formed in the active silicon layer and connected to the optical circuit. The optical waveguide termination includes a light-receiving inlet for receiving light to be terminated, a rib waveguide extending from the inlet, a doped, light-absorbing slab supporting the rib waveguide for absorbing light from the rib waveguide and a tip at an end of the rib waveguide.

In some implementations, the rib waveguide has a curved waveguide section. In some implementations, the slab comprises an angled back facet. In some implementations, the light-receiving inlet comprises an input ridge waveguide connected by a first transition to a down-tapered waveguide section which is connected by a second transition to the rib waveguide. In some implementations, the slab is shaped and angled to internally reflect light to thereby function as a resonating absorber.

Yet another inventive aspect of the disclosure is a method of terminating light. The method entails receiving light to be terminated at a light-receiving inlet of an optical waveguide termination, propagating the light through a rib waveguide extending from the inlet, and absorbing light from the rib waveguide using a doped, light-absorbing slab supporting the rib waveguide.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without certain specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

In general, an optical waveguide termination (or terminator) having low back-reflection is disclosed herein. For the purposes of this specification, the expression "back-reflection" refers to the reflectance or optical return loss, i.e. the amount of light that is reflected by the end facet of the waveguide. Various embodiments of the optical waveguide termination are described below with reference to the drawings.

Figure 1:
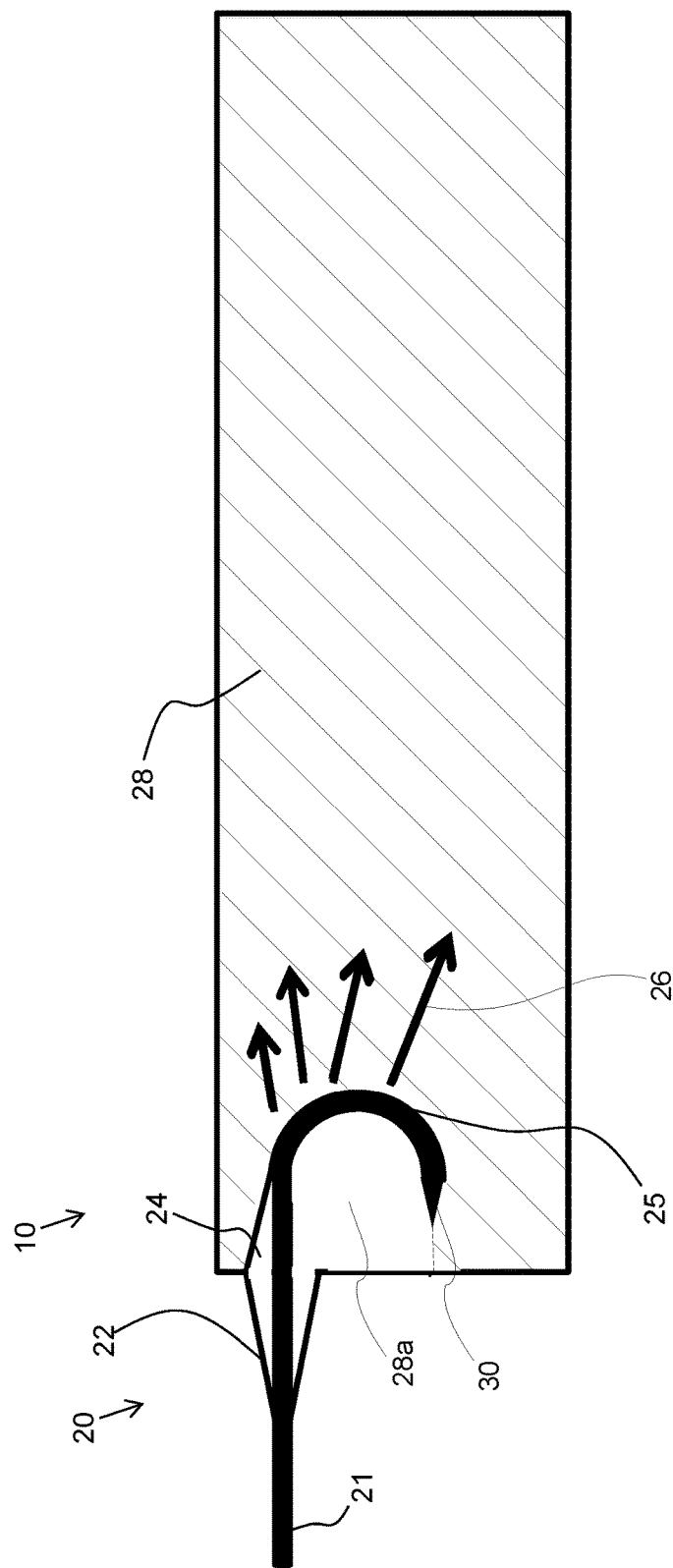
FIG. 1 depicts an optical waveguide termination having a doped, light-absorbing slab supporting a curved rib waveguide in accordance with one embodiment of the present invention.

FIG. 1 illustrates, by way of example, an optical waveguide termination designated by reference numeral 10. The optical waveguide termination 10 includes a light-receiving inlet 20 for receiving light to be terminated. The optical waveguide termination 10 includes a rib waveguide 25 extending from the inlet 20. The optical waveguide termination 10 includes a doped, light-absorbing slab 28 supporting the rib waveguide 25 for absorbing light from the rib waveguide 25. The optical waveguide termination 10 also includes a tip 30 at an end of the rib waveguide 25. In some embodiments, the rib waveguide 25 is also doped. The rib waveguide 25 may be doped using the same type and concentration of dopant as used in the slab 28. Alternatively, the rib waveguide 25 may have a different type and/or different concentration of dopant as used in the slab 28. The dopant may be implanted into the slab 28 using an ion implantation window. In some embodiments, the entire slab is doped. In other embodiments, there is a undoped region or undoped portion 28a of the slab 28.

In the embodiment depicted in FIG. 1, the rib waveguide 25 is curved, i.e. the rib waveguide 25 includes a curved waveguide section, so that light 26 can escape the rib waveguide 25. As shown in FIG. 1, the curved section of the rib waveguide 25 may include a semicircular waveguide section.

In the embodiment depicted in FIG. 1, the light-receiving inlet 20 has an input ridge waveguide 21 connected by a first transition 22 and a second transition 24 to the rib waveguide 25. The first transition 22 is from the input ridge waveguide 21 to the rib waveguide 25. The second transition 24 is from an undoped region 28a to the doped slab 28. The first and second transitions 22, 24 may be achieved using geometrical transitions (e.g. tapers). However, in other embodiments, the transitions 22, 24 may be implemented as a gradient of doping whose dopant concentration varies in a direction of light propagation. In the figures, the doped slab 28 (i.e. the doped portion of the slab) is shown with cross hatching to distinguish it from the undoped region 28a (i.e. the undoped portion of the slab).

Figure 2A:
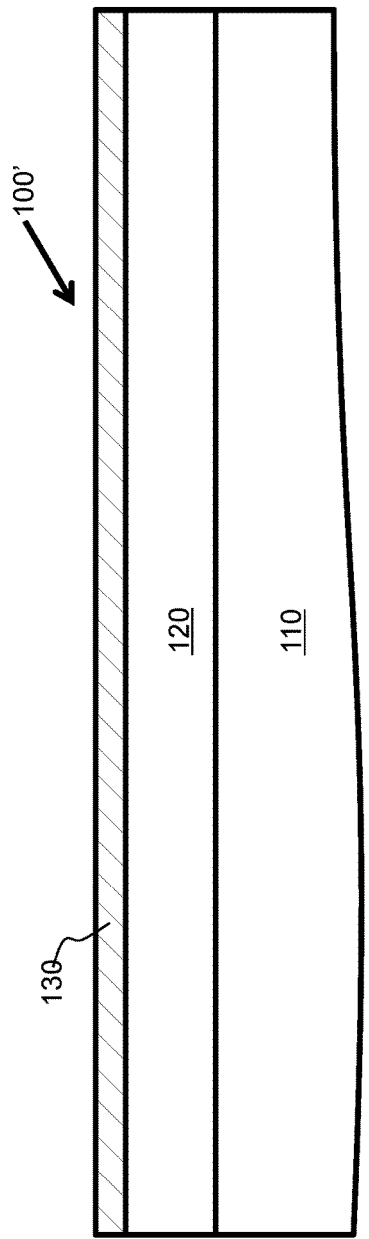
FIGS. 2A and 2B depict a process of fabricating a photonic platform to include a doped slab.
Figure 2B:
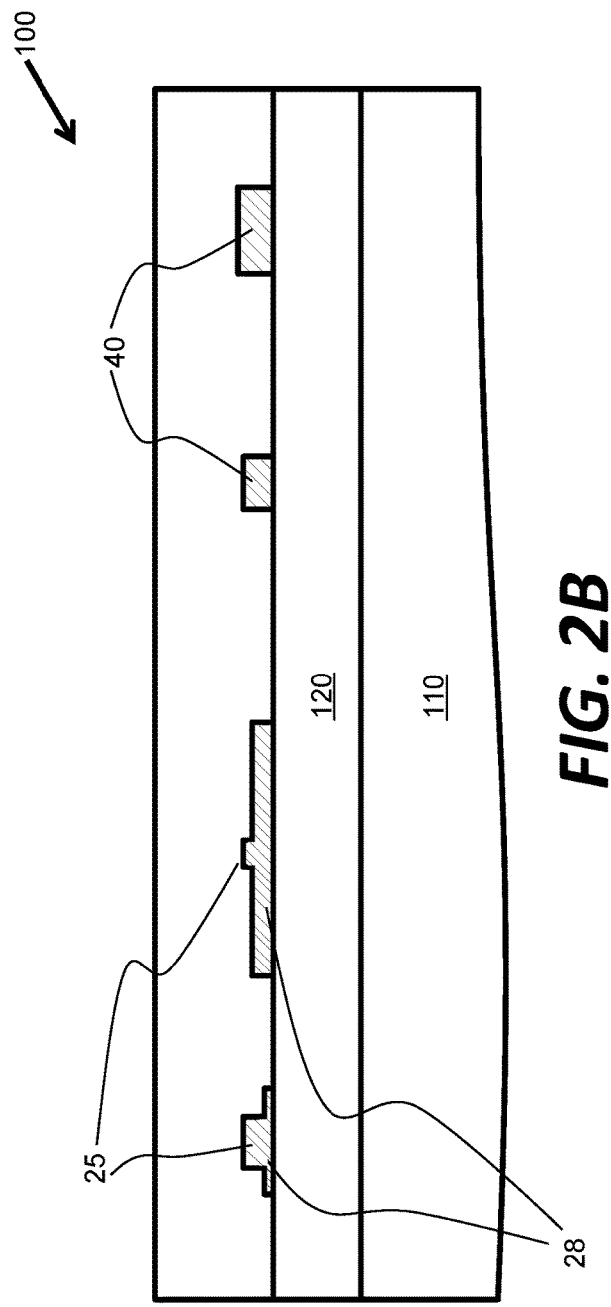

The input ridge waveguide 21, the rib waveguide 25 and the doped slab 28 that constitute the optical waveguide termination 10 may be fabricated by partially etching an active silicon layer 130 of a material stack 100'. As shown in FIGS. 2A and 2B, the material stack 100' from which a photonic platform 100 is fabricated, includes a substrate 110, a buried oxide layer 120 and the active silicon layer 130. Partial etching of the active silicon layer 130 can be used to form one or more rib waveguides 25. Ridge waveguides 40 of other optical components or circuitry can be formed, for example, by full etching of the active silicon layer 130. The optical waveguide termination 10 may also be formed by deposition, epitaxial growth or other suitable fabrication technique.

Figure 3:
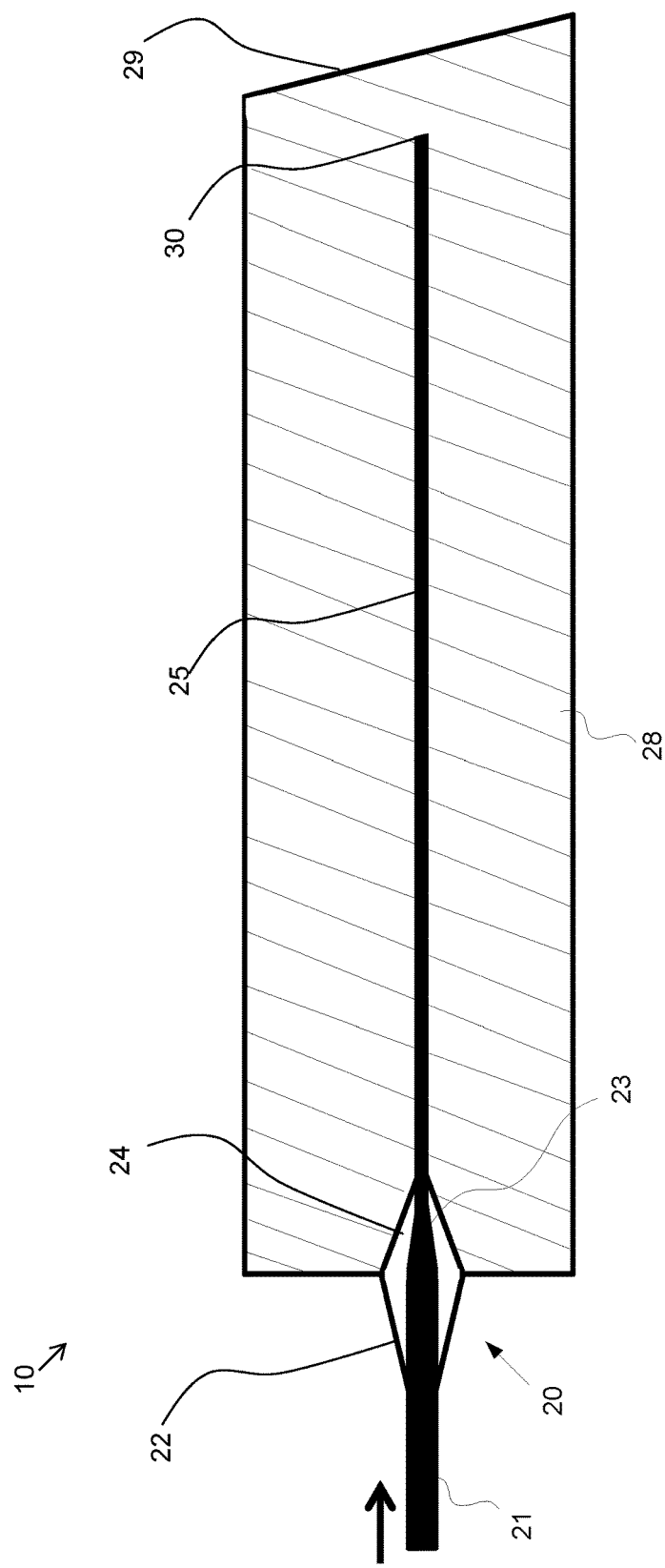
FIG. 3 depicts an optical waveguide termination in which the doped, light-absorbing slab has an angled back facet in accordance with another embodiment.

In the embodiment illustrated by way of example in FIG. 3, the light-receiving inlet 20 may include an input ridge waveguide 21 connected by a first transition 22 to a down-tapered waveguide section 23 which is connected by a second transition 24 to the rib waveguide. The first transition 22 may be a diverging taper and the second transition 24 may be a converging taper. In the embodiment depicted in FIG. 3, the rib waveguide 25 is narrower than the input ridge waveguide 21.

In the embodiment depicted by way of example in FIG. 3, the slab 28 includes an angled back facet 29 to further suppress back-reflection. The angle of the back facet 29 shown in FIG. 3 may be varied. The back facet 29 may be spaced apart from the tip 30 as shown in this figure.

Figure 4:
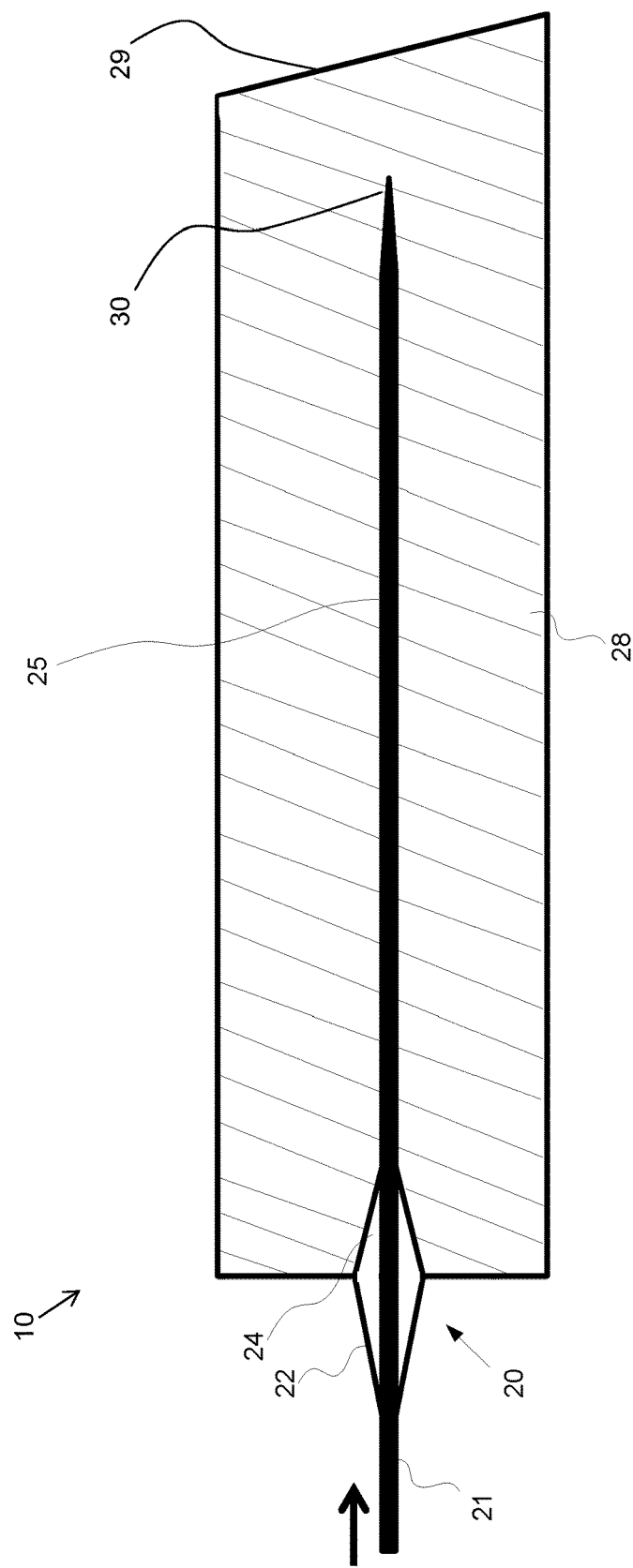
FIG. 4 depicts an optical waveguide termination in which the tip is tapered in accordance with another embodiment.

In the embodiment depicted by way of example in FIG. 4, the tip 30 of the optical waveguide termination 10 is tapered to increase light scattering from the tip 30 for cases where some light still reaches the tip 30. The geometry of the taper of the tip 30 shown in FIG. 4 may be varied. In FIG. 4, the back facet 29 is also angled to redirect residual reflected light away from the rib waveguide 25.

Figure 5:
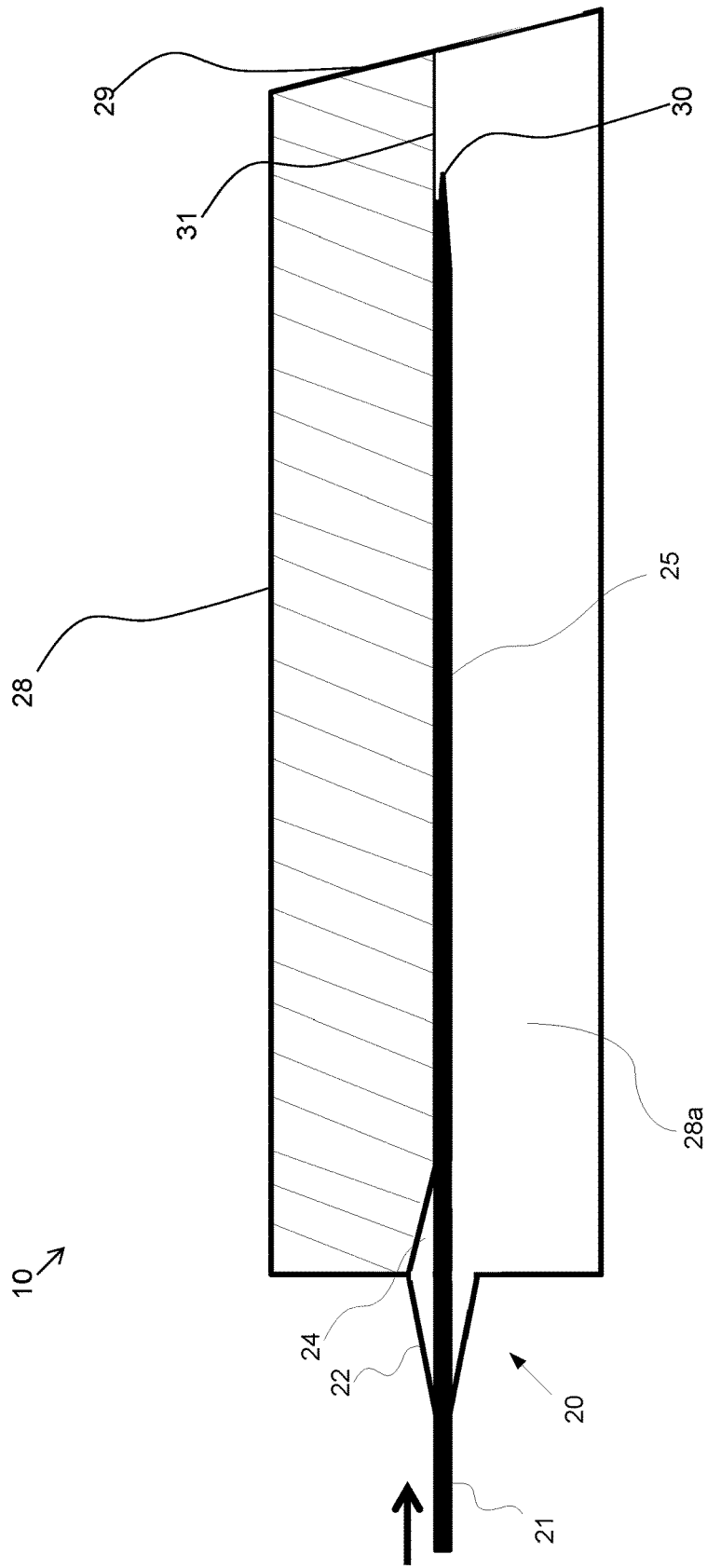
FIG. 5 depicts an optical waveguide termination in which the doped, light-absorbing slab has a dopant gradient in accordance with another embodiment.

In the embodiment of the optical waveguide termination 10 depicted by way of example in FIG. 5, the doped slab 28 comprises a dopant gradient. The dopant gradient may be progressive or there may be a stepwise change in a dopant concentration. In one embodiment, the doped slab 28 and the undoped region 28a are divided by a boundary 31. In this embodiment, the back facet 29 is angled to re-direct the back-reflected light away from the rib waveguide 25. The tip 30, in this embodiment, is tapered. The boundary 31 may be substantially aligned with the rib waveguide 25. In the embodiment of FIG. 5, the boundary 31 may extend substantially along a plane of symmetry or through a geometric centroid of the slab 28.

Figure 6:
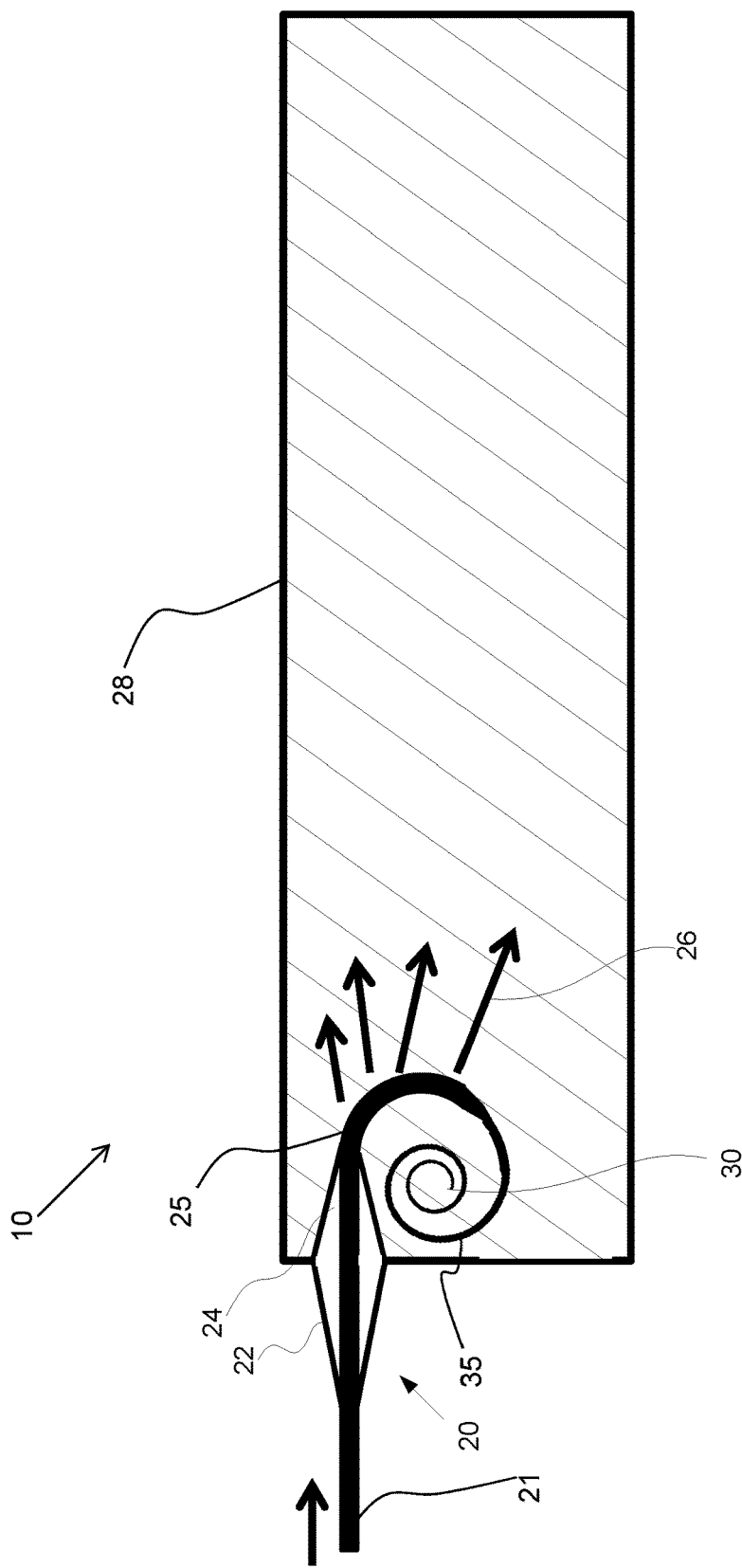
FIG. 6 depicts an optical waveguide termination in which the doped, light-absorbing slab has a spiral rib waveguide in accordance with another embodiment.

In the embodiment of the optical waveguide termination 10 depicted in FIG. 6, the curved section of the rib waveguide 25 is a spiral-shaped waveguide section 35. In the embodiment shown in FIG. 6, the rib waveguide 25 has a waveguide width that continuously decreases from the light-receiving inlet 20 to the tip 30. In another embodiment, the width of the rib waveguide 25 is uniform. The optical waveguide termination 10 having the spiral-shaped waveguide section 35 is not only compact but also exhibits low back-reflection. The compact design is particularly beneficial in dense photonic circuits where space is limited. The continuously decreasing radius of curvature of the optical waveguide termination 10 increases a loss coefficient due to the light 26 escaping the spiral-shaped waveguide section 35. Likewise, progressively reducing the width of the spiral-shaped waveguide section 35 increases the loss coefficient. The spiral parameters are such that losses are distributed along the spiral length so that most power is radiated before the light reaches the tip 30. Distributing the losses in this manner reduces the amount of back-reflection.

In the embodiment shown in FIG. 6, the spiral-shaped waveguide section 35 is a logarithmic spiral. In a specific implementation, the radius of curvature varies on log scale from 5 μm to 1 μm over 30 μm length. In polar coordinates, the logarithmic spiral may be expressed as $r=ae^{b\theta}$ in which r represents the radius, a and b are arbitrary constants, θ represents the angle and the constant e represents the base of the natural logarithm. In other embodiments, the spiral may have another type of geometry, e.g. a hyperbolic spiral or an Archimedean spiral.

Figure 7:
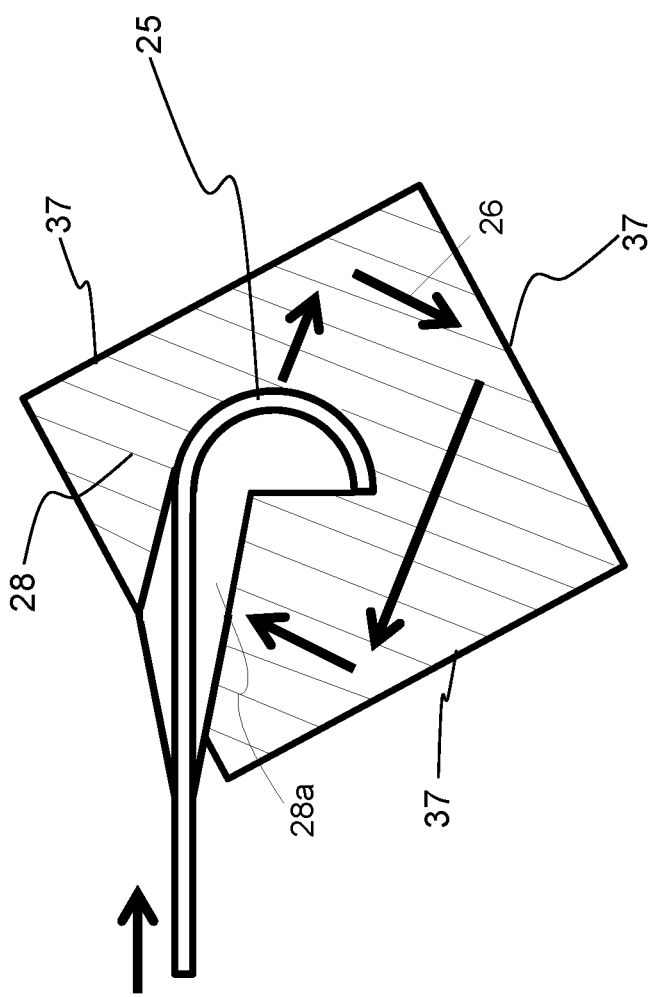
FIG. 7 depicts an optical waveguide termination in which the doped, light-absorbing slab is shaped and angled to act as a resonating absorber in accordance with another embodiment.

In the embodiment depicted in FIG. 7, the slab 28 is shaped and angled to internally reflect light to thereby function as a resonating absorber. Light 26 that is ejected or leaked from the rib waveguide 25 is internally reflected by the angled faces 37 of the doped slab 28. Internal reflection of the leaked light augments absorption by the doped slab, because the light 26 tends to be reflected in a circular fashion, which allows the light 26 to be absorbed in the doped slab 28 more effectively. The shape of the doped slab 28 could be square as shown in this figure or rectangular as illustrated in previous figures. Other polygonal shapes could be substituted. The shape of the doped slab 28 could be circular or elliptical.

Figure 8:
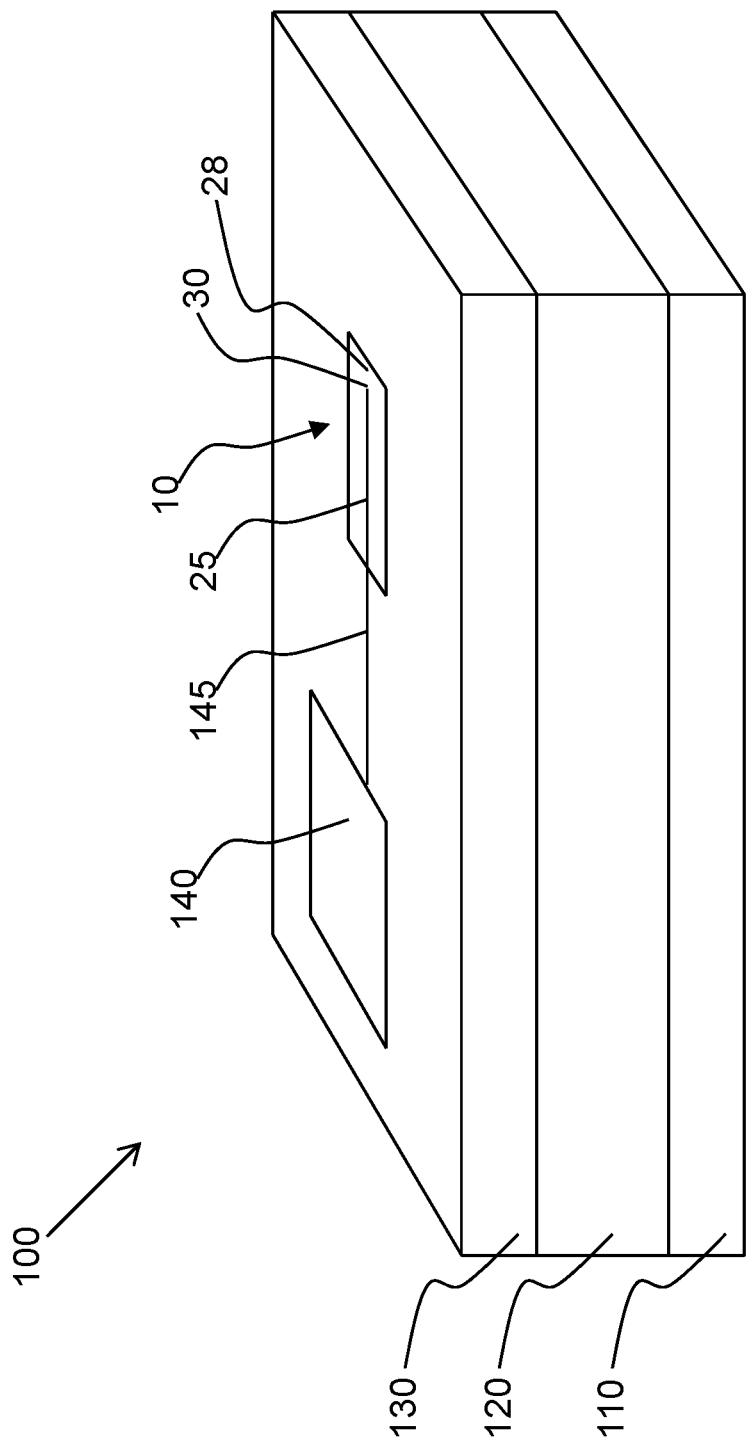
FIG. 8 depicts a photonic platform incorporating the optical waveguide termination.

FIG. 8 depicts a photonic platform 100, e.g. a silicon photonic platform such as a silicon-on-insulator (SOI) photonic integrated circuit (PIC). The photonic platform 100 includes the substrate 110, the buried oxide layer 120 and the active silicon layer 130 in which an optical circuit 140 is formed. The optical circuit 140 includes the optical circuit waveguide 145 connected to the optical waveguide termination 10. The optical waveguide termination 10 is disposed in the active silicon layer 130. The optical waveguide termination 10 may be partially etched in the active silicon layer 130 as was described above. Any of the optical waveguide terminations 10 described above may be incorporated into the photonic platform 100. The optical circuit 140 may include any circuit which may need a waveguide termination, for example an a Mach-Zehnder interferometer or any circuitry based on a Mach-Zehnder interferometer, such as an optical switch matrix, a modulator, an optical filter, an interleaver, etc. Unused ends of optical waveguide circuits of various types may be terminated using the optical waveguide termination 10 embodiments described above.

Figure 9:
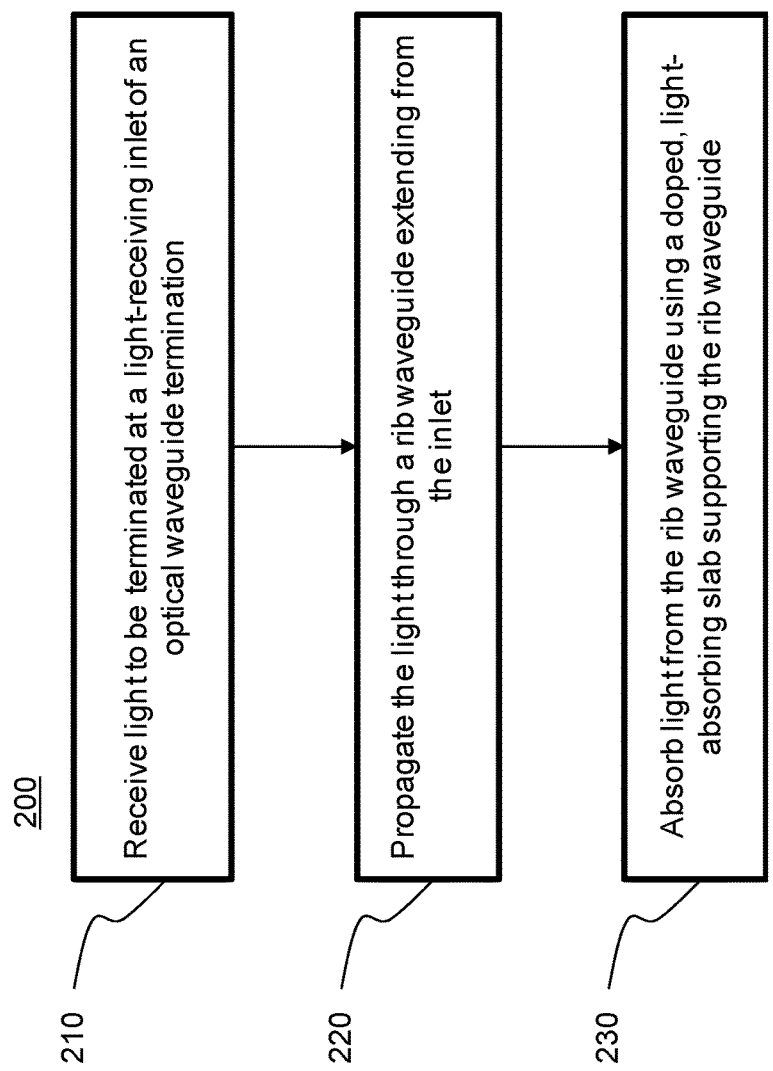
FIG. 9 illustrates a flowchart of a method of terminating light using the optical waveguide termination.

Depicted in FIG. 9 is a method 200 of terminating light using the optical waveguide termination 10 disclosed above. The method 200 entails a step 210 of receiving light to be terminated at the light-receiving inlet 20 of the optical waveguide termination 10, a step 220 of propagating the light through the rib waveguide 25 extending from the inlet 20, and a step 230 of absorbing the light from the rib waveguide 25 using the doped, light-absorbing slab 28 supporting the rib waveguide 25. One advantage of absorbing light in the light-absorbing slab 28 is that the absorbed light is prevented from further scattering in various layers of the photonic platform 100 shown in FIG. 8.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. An optical waveguide termination comprising:
   a doped, light-absorbing slab defining a first plane and having a width;
   a light-receiving inlet of an input ridge waveguide at a first boundary of the slab;
   a rib waveguide lying in a second plane parallel to the first plane and supported by the slab and extending from the inlet to a tip at an end of the rib waveguide, the width of the rib waveguide being less than the width of the slab; and
   at least one transition surrounding the rib waveguide and coupling the rib waveguide to the inlet of the input ridge waveguide;
   wherein the tip is spaced-apart from the boundaries of the slab to allow light to escape therefrom and into the slab and reduce an amount of back-reflection therefrom.

2. The optical waveguide termination of claim 1 wherein the rib waveguide is also doped.

3. The optical waveguide termination of claim 1 wherein the rib waveguide comprises a curved waveguide section supported by the slab.

4. The optical waveguide termination of claim 3 wherein the curved waveguide section comprises a semicircular or a spiral-shaped waveguide section.

5. The optical waveguide termination of claim 1 wherein the rib waveguide and the slab comprise silicon.

6. The optical waveguide termination of claim 5 wherein the rib waveguide and slab are formed by partially etching a silicon layer.

7. The optical waveguide termination of claim 1 wherein the tip is tapered.

* * * * *